United States Patent Office 3,174,056
Patented Mar. 16, 1965

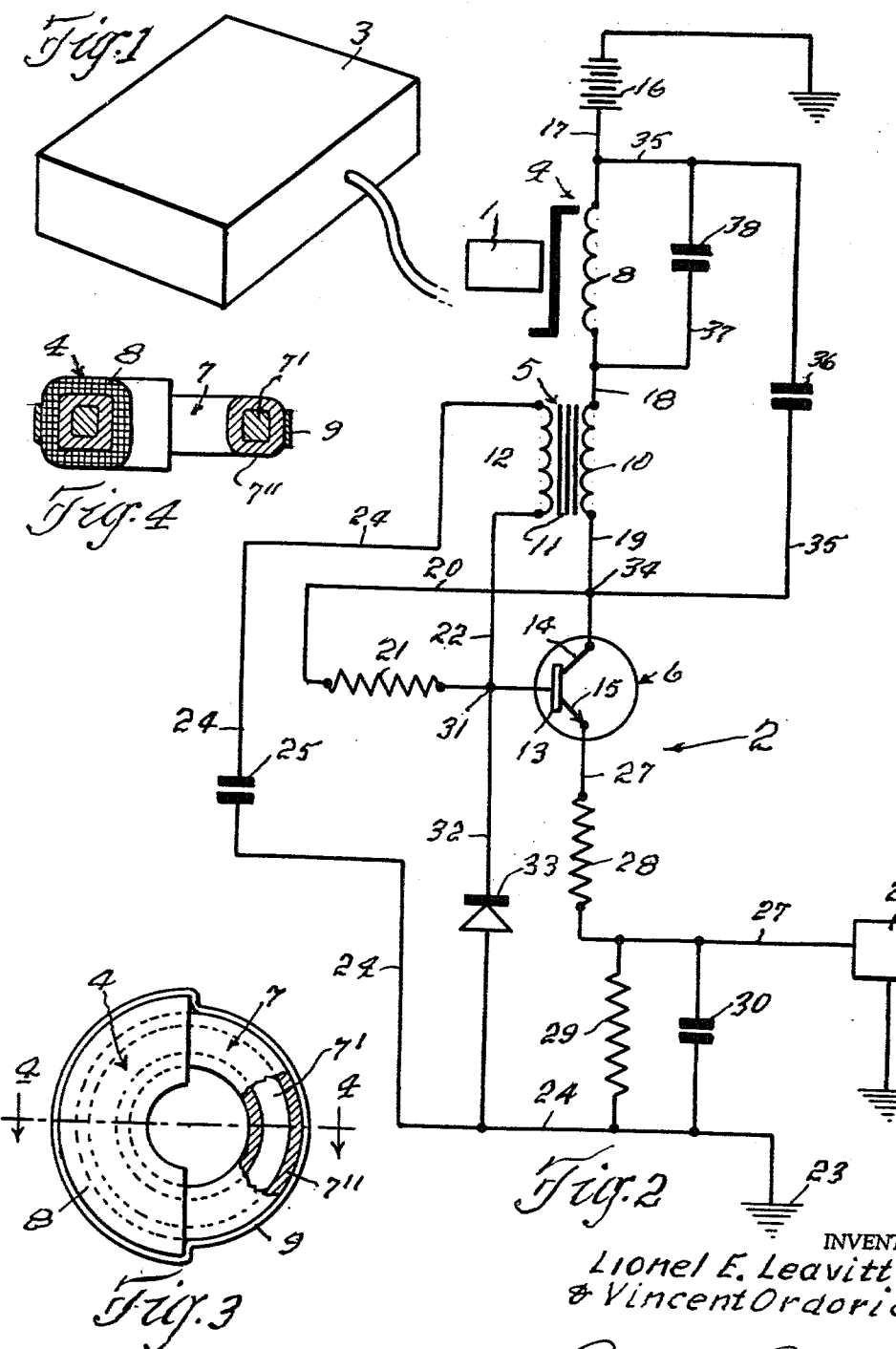

3,174,056
TRANSISTOR BI-STABLE PROXIMITY SENSOR
Lionel E. Leavitt, Forest Hills, and Vincent Ordorica, Brooklyn, N.Y., assignors to Sperry Rand Corporation, Ford Instrument Company Division, Wilmington, Del.
Filed Apr. 18, 1961, Ser. No. 103,865
4 Claims. (Cl. 307—88.5)

This invention relates to what is generally known as a proximity device which is operative to sense the proximity of a particular moving or stationary item with respect thereto. The device, which is entirely electrical in operation and devoid of any mechanical moving parts, includes a small permanent magnet and a sensing mechanism. The device may be used in counting the number of particular items passing a given point, the speed of rotation of a particular rotating member, the approach of a particular member to a fixed position, and for various other purposes. When it is used for counting passing items a magnet is secured to each item and the sensing mechanism is mounted in fixed position in close proximity to the path of the passing items. Each time an item, with a magnet thereon, passes the mechanism it triggers the mechanism to effect the operation of a counter. When the device is used for indicating the speed of rotation of a rotating member a magnet is secured to the member for rotation therewith and the sensing mechanism is mounted in fixed position in close proximity to the path of the magnet, and each time the magnet passes the mechanism it triggers the mechanism to effect the operation of a tachometer. When the device is used to indicate the approach of a member, such for example as an elevator, to a given fixed position, the sensing mechanism is mounted on the member and the magnet is mounted in fixed position at the given position in close proximity to the path of the sensing mechanism. Then each time the sensing mechanism approaches the magnet the magnet effects the triggering of the mechanism to energize, for example, a controlled rectifier which may affect the operation of a work producing device.

As previously stated, the device includes a small permanent magnet and sensing mechanism. The magnet is preferably of the rod type having a high flux density; and the sensing mechanism includes a transistor, an inductor having a tape wound toroidal core, a pulse transformer, and various resistors and capacitors all of which are incorporated in a circuit which is adapted to be interposed between a voltage source and a load adapted to be actuated by the sensing mechanism each time the magnet is in close proximity to the tape wound toroidal core inductor. At a predetermined minimum distance of the magnet from the inductor the output of the sensing mechanism will be at a maximum high which will be hereinafter referred to as the "on" condition; and when the magnet is withdrawn a predetermined distance, in the order of a few thousandths of an inch, from the proximity of the inductor the output of the sensing mechanism will be at a minimum low which will be referred to hereinafter as the "off" condition. During operation the pulse transformer leakage inductance, the instantaneous inductance of the inductor coil, and the capacitance of the tank circuit determine the operating frequency of the transistor oscillator. The frequency of the oscillator determines the voltages developed across the inductor coil and the pulse transformer primary winding, which in turn determine the output voltage of the sensing mechanism to the load.

The interaction of the frequency and the increasing voltage produce a ferro-resonant effect across the "tank" circuit. The term "ferro-resonance" is used herein to denote a phenomenon brought about with nonlinear reactive circuits. For example, if in a series tuned circuit the inductor changes its inductance with applied voltage, the inductance as it approaches a resonant condition with the capacitor at a particular frequency, the voltage across the inductor increases. This increase in inductor voltage tends to lower the inductance still further, which results in an increase in the output voltage of the series tuned circuit. This ferro-resonant effect causes a jump in voltage amplitude which is fed back to the base circuit. This immediately determines a new operating point for the transistor oscillator in addition to the larger amplitude swings. Due to this larger amplitude a new steady state condition is achieved for the transistor oscillator which lowers the inductances of the inductor coil and the primary inductance of the pulse transformer, and causes an increase in the steady state oscillator frequency. Therefore two conditions develop corresponding to the high and low voltages, one of which is the "off" condition where the operating point of the transistor oscillator is restricted to a lower portion of the load line where the operating frequency and voltage amplitude are low; and the other of which is the "on" condition where the operating point is moved up the load line and the amplitude and frequency of the oscillations has increased.

One of the principal objects of the invention is to provide a proximity sensing device of the aforesaid character which is extremely accurate with respect to the "on" and "off" conditions thereof.

Another object of the invention is to provide a proximity sensing device which is entirely electrical in construction and operation and is devoid of any mechanical moving parts.

Another object of the invention is to provide a proximity sensing device of the aforesaid character which is of very simple construction and has an extremely long life, being capable of billions of switching operations without failure.

Still another object of the invention is to provide a proximity sensing device having a sensing mechanism which is of minute size, being capable of being enclosed in a rectangular casing which is approximately seven-eighths of an inch wide, by five-sixteenths of an inch high, by one inch long.

Having stated the principal objects of the invention other and more specific objects of the invention will be apparent from the following specification and the accompanying drawings forming a part thereof in which:

FIG. 1 is an enlarged perspective view of the casing in which the sensing mechanism is enclosed;

FIG. 2 is a diagrammatic layout of the sensing mechanism;

FIG. 3 is an enlarged plan view of the tape wound toroidal core inductor, partially in section for the purpose of illustration, which is used in the sensing mechanism; and FIG. 4 is a transverse section taken on the line 4—4 on FIG. 3.

The proximity sensing device of the invention will now be specifically described in connection with the drawing using numerals to denote the various elements of the mechanism. The device, as disclosed herein, consists of a small permanent magnet 1, preferably of the rod type, having a high flux density, and a sensing mechanism, generally indicated by the numeral 2, which is enclosed in a rectangular case 3 and comprises an inductor 4, a pulse transformer 5 and a transistor 6.

The inductor 4 comprises a tape wound toroidal core 7 having a 180° sector winding 8 wound thereon. A narrow strip 9 of high permeability, which is known under the trade name "Co-Netic A" and acts as a magnetic focusing device, is disposed about the outer periphery of the winding 8 and the exposed section of the core 7. The tape wound toroidal core 7 comprises a stainless steel nonmagnetic bobbin 7', having approximately ten wraps of square loop material, such as a mo-permalloy tape 7", wound thereon. The winding 8 will give the same circuit results regardless of whether it is distributed or sector wound upon the core 7. It is shown herein as 180° sector wound only for the purpose of convenience in mounting the inductor 4 in the casing 3. The correct number of turns of the winding 8 is dependent on the oscillator frequency of the transistor 6, and the inductance necessary to start ferro-resonance.

The pulse transformer 5 comprises the primary winding 10, the core 11, and the secondary winding 12; and the transistor 6 comprises the base 13, the collector 14, and the emitter 15.

One end of the inductor winding 8 is connected to a voltage source 16 by an input conductor 17 and the other end thereof is connected to one end of the primary winding 10 of the pulse transformer 5 by a conductor 18. The other end of the pulse transformer primary winding 10 is connected to the collector 14, of the transistor 6, by a conductor 19, and to the transistor base 13 by conductor 20 in which a biasing resistor 21 is interposed between the conductor 19 and the transistor base 13. One end of the secondary winding 12 of the pulse transformer 5 is connected to the base 13 of the transistor 6 by a conductor 22 which is connected to the conductor 20 between the biasing resistor 21 and the transistor base 13; and the other end of the secondary winding 12 of the pulse transformer is connected to a ground 23 by a ground conductor 24 having a base capacitor 25 interposed therein.

The emitter 15 of the transistor 6 is connected to a load 26 by an output conductor 27 having an emitter resistor 28 interposed therein. As previously stated the load 26, which is adapted to be actuated by the sensing mechanism 2 each time it is triggered by the magnet 1, may be a counter, a tachometer, a relay or other device depending on the particular use of the proximity device. A load resistor 29 and a filter capacitor 30 are connected across the output conductor 27 and the ground conductor 24 between the emitter resistor 28 and the load 26.

The junction 31, of the conductor 22 with the conductor 20, is connected to the ground conductor 24 by a conductor 32 having a diode 33 interposed therein. The junction 34, of the conductor 20 with the conductor 19, is connected back to the input conductor 17 by a conductor 35 having a circuit capacitor 36 interposed therein; and the conductor 18 is connected, between the winding 8 of the inductor 4 and the primary winding 10 of the pulse transformer 6, back to the input conductor 17 by a conductor 37, having a trimmer capacitor 38 interposed therein.

The "tank" or tuned circuit referred to herein comprises the inductor 4, the primary winding 10 of the pulse transformer 5, the circuit capacitor 36, and the trimming capacitor 38; and the base circuit referred to herein comprises the secondary winding 12 of the pulse transformer 5, the biasing resistor 21, the base capacitor 25, and the diode 33.

The term "hysteresis" is used herein to denote the effective linear distance of the magnet 1 from the inductor 4 between the "on" and "off" conditions of the sensing mechanism 2.

The operation of the various units of the sensing mechanism 2 during use of the proximity device will now be described. As previously stated the sensing mechanism 2 is triggered to the "on" condition whenever the magnet 1 and the indicator 4 are brought within effective range of each other; and the sensing mechanism 2 is triggered to the "off" condition whenever the magnet 1 is disposed without the effective range of the inductor 4. Whenever the magnet 1 is within the effective range of the inductor 4 the magnet's lines of flux change the dynamic characteristics of the tape wound core 7, and in the "off" condition of operation the hysteresis loop of the core 7 instantaneously exhibits a relatively high inductance. This high inductance contributes to a lower oscillator frequency and keeps the voltage across the tank circuit low, which is due to the off-resonance condition of the reactances. In the "on" condition, when the magnet is within the effective distance of the inductor 4, the presence of the inductive field of the magnet 1 reduces the inductance of the winding 8 of the inductor 4, and a larger voltage is imparted through the tank circuit and the pulse transformer 5. Because of this approach to a resonance condition the phenomena of ferro-resonance takes place. Therefore when the magnet 1 is within the effective range of the inductor 4 the sensing mechanism 2 is triggered to the "on" condition in which a maximum voltage is imparted to the load 26 through the output conductor 27; and when the magnet 1 is without the effective range of the inductor 4 a negligible low voltage is constantly imparted to the load 26 which has no effect thereon.

The transistor presently used in the proximity device, as shown herein, comprises an npn silicon double diffused mesa transistor, but any transistor possessing approximately a 2.5B spread and the correct breakdown voltages may be used.

The pulse transformer 5 used herein is a miniature transistor type such as manufactured by "Aladdin Electronics." But, however, any ferrite pot transformer having the proper inductances and turns ratio to satisfy the circuit requirements can be used. The primary and secondary leakage inductance of the pulse transformer 5 differ by a factor of nine. The primary inductance is a primary factor in determining the oscillator frequency of the transistor oscillator 6. The transformer 5 also couples the collector and base circuits thereof so that continued oscillations will occur. The turns ratio is step-up which is different from the step-down ratio used for base current in conventional transistor blocking oscillators. The present turns ratio offers a high A.C. impedance looking from the base circuit. This A.C. impedance in conjunction with the base circuit capacitance maintains the A.C. phase relationship so that the loop gain of the oscillator is greater than unity. This loop gain, of unity or greater, is a necessary criteria for oscillations to exist since the loop gain is unity or greater in both the "on" and "off" conditions of the sensing mechanism 2. The pulse transformer 5 is therefore a determining factor for oscillations in both the "on" and the "off" conditions of the sensing mechanism 2.

The biasing resistor 21 is an important factor of the circuit operation in the "off" condition and is one of the components which determine the hysteresis. The collector 14 voltage at any instant divided by the resistor 21 gives the base 13 current due to this resistor. In the "off" condition the collector voltage is high and the base current is just enough to bring the transistor oscillator out of cutoff. This allows small amplitude oscillations to exist in the "off" condition of the sensing mechanism 2. Without the biasing resistor 21 the "on" condition of the mechanism could never be effected due to the continuous state of cutoff.

The emitter resistor 28 raises the A.C. input impedance of the base circuit and renders the base circuit insensitive to transistor parameter variations. It also provides a buffer to help limit any peak currents flowing through the base circuit to the emitter 15 of the transistor 6 in the reverse direction, which situation does occur, at which time a reverse current flows through the emitter resistor 28.

The output voltage of the sensing mcahnism 2 to the load 26 is taken from the combination of the load resistor 29 and the filter capacitor 30. In the "off" condition a small sinusoidal waveform riding on an average value is filtered to give a low D.C. output of approximately one volt. In the "on" condition the D.C. output rises to approximately fifteen volts. The 15:1 change applies, in both the "on" and "off" conditions, on a D.C. voltage with a fairly low ripple content.

The tank circuit capacitor 36, which is tuned with the inductances of the tank circuit, effectively controls the frequency of the sensing mechanism 2, and the frequency and voltage, control the ferro-resonant effect of which the capacitor 36 is a part. The value of capacitance also contributes to the loop gain of the oscillator. A plus or minus 20% variation in this capacitance will render the mechanism inoperable.

The trimmer capacitor 38 is provided to reduce the hysteresis by increasing the voltage across the tape wound core 7 thereby reducing its inductance which hastens the ferro-resonant effect in the tank circuit, which in turn changes the "on" condition point and consequently the hysteresis.

The base capacitor 25 is provided to control the transistor biasing change in the "off" and "on" conditions, and the phase relationship between the output and the base input signals. The voltage fed back charges the capacitor. In the "off" condition when the capacitor 25 is positively charged a discharge path is provided through the transistor base circuit; and when it is negatively charged a discharge path is provided through the diode 33. In the "on" condition the capacitor 25 cannot discharge its negative voltage during a part of the cycle. The phase relation is such that the feedback voltages are relatively sinusoidal and are approximately in phase in both the "off" and "on" conditions. The phase relationship must be maintained for oscillator loop gain of unity or better.

The diode 33 changes the trigger "on" point and thereby reduces the effective hysteresis. In the "off" condition, just before triggering "on," the base to emitter voltage of the transistor is prevented from going negative, which allows the mechanism to go "on" more quickly. When the mechanism is "on" and is about to go "off" the diode 33 has no effect since it is back biased by a large positive capacitor voltage, which permits the base to emitter voltage of the transistor to go negative so that the "off" point is not changed and the hysteresis is therefore reduced.

From the foregoing it will be apparent to those skilled in the art that we have provided a very simple and efficient mechanism for accomplishing the objects of the invention.

It is to be understood that we are not limited to the specific construction shown and described herein, as various modifications may be made therein, within the spirit of the invention and the scope of the appended claims.

What is claimed is:

1. A proximity device comprising a core having an inductance coil wound thereon, a step-up transformer having a primary and a secondary winding, a voltage source connected to one side of said coil, the other side of said coil being connected to one side of said primary winding, a tank capacitor shunting said coil and primary winding, an oscillator transistor having a collector, emitter and base electrodes, said collector electrode being connected to the other side of said primary winding, a first conductor connecting said tank capacitor to said base, a biasing resistor in said first conductor, a second conductor connecting the emitter electrode to ground, an emitter resistor in said second conductor, a conductor connecting one side of the secondary winding to the base electrode of said transistor and a grounded conductor connecting the other side of said secondary winding to ground.

2. A device as defined in claim 1 wherein a base capacitor is disposed in said grounded conductor for controlling transistor biasing change in "on" and "off" conditions and the phase relationship between the output and base input signal.

3. A device as defined in claim 2 wherein a trimmer capacitor is disposed across said coil for increasing the voltage across the coil and thereby expediting the ferro-resonant effect and the "on" point in the oscillating cycle in the transistor.

4. A device as defined in claim 3 wherein a diode is disposed in said first grounded conductor for preventing the base to emitter voltage from going negative in "off" condition.

References Cited by the Examiner
UNITED STATES PATENTS

| | | | |
|---|---|---|---|
| 2,809,239 | 10/57 | Nielsen | 331—117 |
| 2,896,170 | 7/59 | Grewe | 331—117 |
| 2,907,931 | 10/59 | Moore | 307—88.5 |
| 2,919,416 | 12/59 | Jones | 331—117 |
| 2,964,693 | 12/60 | Ehret | 307—88.5 |
| 2,964,694 | 12/60 | Adams | 307—88.5 |
| 3,047,850 | 7/62 | Schmidt | 331—117 |
| 3,061,823 | 10/62 | Crossley | 331—117 |

FOREIGN PATENTS

| | | |
|---|---|---|
| 1,086,302 | 8/60 | Germany. |

JOHN W. HUCKERT, *Primary Examiner.*